United States Patent
Dhillon

(10) Patent No.: US 9,573,844 B2
(45) Date of Patent: Feb. 21, 2017

(54) METHOD OF POWDER COATING GLASS TO BLOCK VISIBLE AND NONVISIBLE LIGHT

(71) Applicant: Sundial Industries, Inc., Sun Valley, CA (US)

(72) Inventor: Shivdeep Dhillon, Simi Valley, CA (US)

(73) Assignee: Sundial Industries, Inc., Sun Valley, CA (US)

( * ) Notice: Subject to any disclaimer, the term of this patent is extended or adjusted under 35 U.S.C. 154(b) by 206 days.

(21) Appl. No.: 13/939,902

(22) Filed: Jul. 11, 2013

(65) Prior Publication Data

US 2015/0017325 A1    Jan. 15, 2015

(51) Int. Cl.
- C03C 17/32 (2006.01)
- C03C 17/42 (2006.01)
- C03C 17/34 (2006.01)
- C03C 17/00 (2006.01)

(52) U.S. Cl.
CPC ......... C03C 17/3405 (2013.01); C03C 17/003 (2013.01); *C03C 2217/74* (2013.01)

(58) Field of Classification Search
CPC ............. C03C 17/3405; C03C 2217/40; C03C 2217/42
USPC .......................................... 427/407.1, 407.2
See application file for complete search history.

(56) References Cited

U.S. PATENT DOCUMENTS

| 4,009,301 A | 2/1977 | Heckman et al. |
| 4,163,031 A | 7/1979 | Hannon et al. |
| 4,201,834 A | 5/1980 | Hannon et al. |
| 4,207,359 A | 6/1980 | Hannon et al. |
| 4,246,368 A | 1/1981 | Murase |
| 4,260,066 A | 4/1981 | Hannon et al. |
| 5,004,503 A | 4/1991 | Kawahara et al. |
| 5,124,211 A | 6/1992 | Kawahara et al. |
| 5,319,001 A | 6/1994 | Morgan et al. |
| 5,747,106 A * | 5/1998 | Matsunaga ............. B05D 7/52 427/181 |
| 5,922,473 A * | 7/1999 | Muthiah et al. ............. 428/481 |
| 2007/0172671 A1* | 7/2007 | Leach ......................... 428/426 |

OTHER PUBLICATIONS

Joe, Maty, "Power Coatings: On the Sidelines for the Green-Building Revolution?", Journal of Architectural Coatings, Aug. and Sep. of 2007, pp. 22-28.

Misev et al, "Power Coatings Technology: New Developments At the Turn of the Century", Journal, Progress in Organic Coatings, Apr. 28, 1998, pp. 160-168.

* cited by examiner

*Primary Examiner* — Alexander Weddle
(74) *Attorney, Agent, or Firm* — SoCal IP Law Group LLP; Mark A. Goldstein

(57) ABSTRACT

Systems and methods of powder coating glass to block light are described herein. The method includes preheating a glass item and applying two or three coats of powder, alternating with heating at desired temperatures and/or for a set time. The glass article may be a glass window or a container for holding items that must be stored or transported without being exposed to light.

13 Claims, 2 Drawing Sheets

© 2013 Sundial Powder Coating

METHOD OF POWDER COATING GLASS TO BLOCK VISIBLE AND NONVISIBLE LIGHT

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to powder coating, and in particular to powder coating a glass item to block visible and nonvisible light from passing through the glass.

Description of the Related Art

Powder coating is a process for coating articles with a sprayed-on organic polymeric material or polymer resin in a powdered form. The powder is typically initially applied electrostatically to an article. The powder is then permanently adhered to the article by the application of heat. The heat causes the powder to melt, liquefy and coat the article. When the article cools, the powder coating cures. Powder coating is typically applied to metal articles such as fence posts, mail boxes, home appliances, patio furniture, bicycles, and other items. Powder coating is an alternative to paint.

DETAILED DESCRIPTION

Systems and methods of powder coating glass to block light are described herein. The powder coating may be placed on glass windows to keep light out a desired amount. The powder coating may be placed on the external portion of glass storage container, jars and the like to keep light out a desired amount or to block all light having particular wavelengths. This may be beneficial for glass storage and dispensing containers, jars, and the like used in transporting and storage of food items (for example, olive oil), alcoholic beverages, nail polish, polish, paint, and other items that spoil, become less effective, cure or become unusable for their intended purpose when exposed to light.

With glass items, the number of powder coats and thickness of application may impede or block varying amounts of light. According to the systems and methods herein, complete blocking of light, blocking visible light, blocking nonvisible light, and/or blocking of desired wavelengths of light may be achieved. According to the systems and methods described herein, a chemically resilient powder coating of glass items may be achieved. That is, the powder coated items will resist and be impervious to certain harsh chemicals. For example, the resulting powder coated glass items will withstand fingernail polish and fingernail polish solvents such as acetone, butyl acetate and ethyl acetate.

Figure 1:
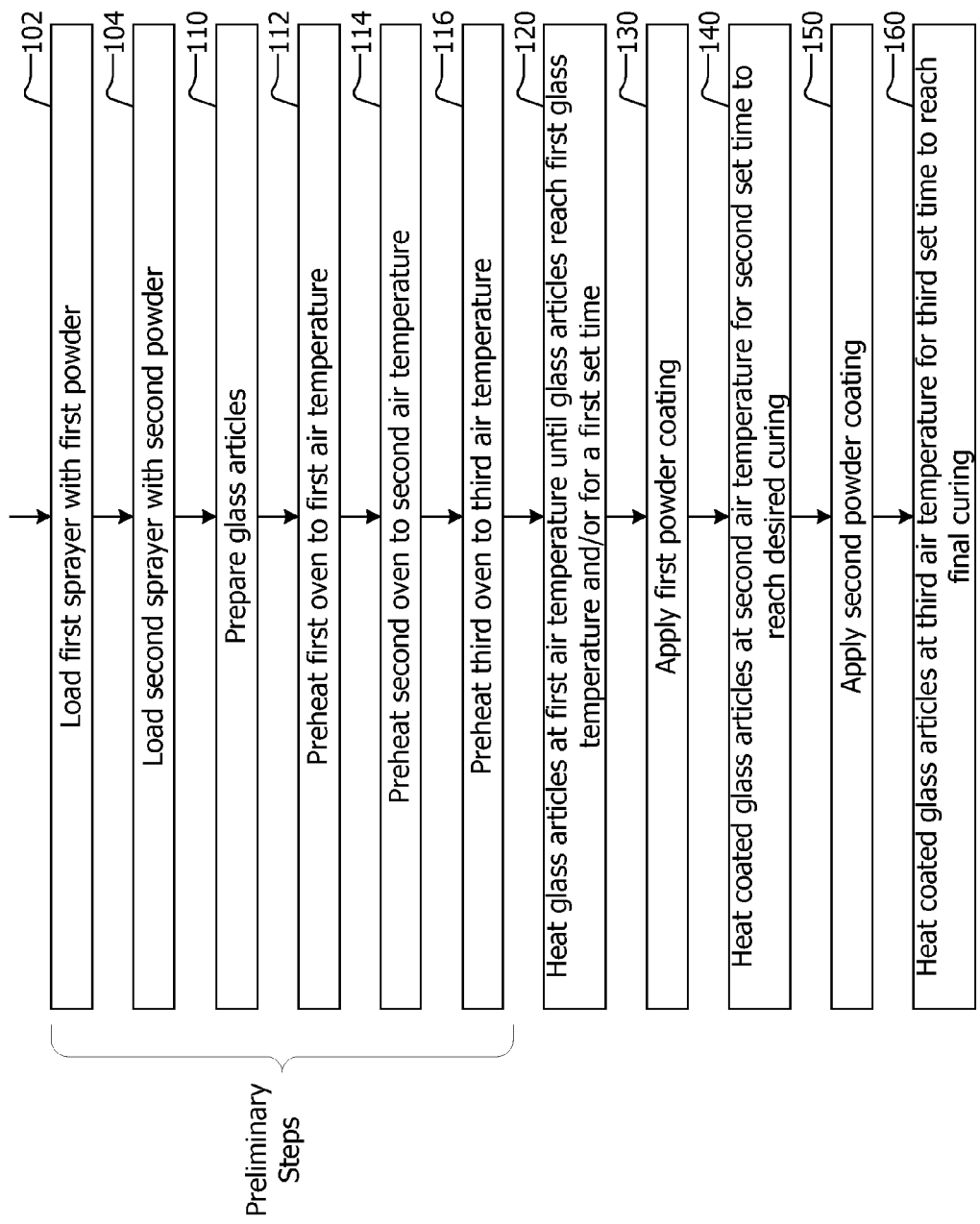
FIG. 1 is a flow chart of a method of powder coating glass items.
Figure 2:
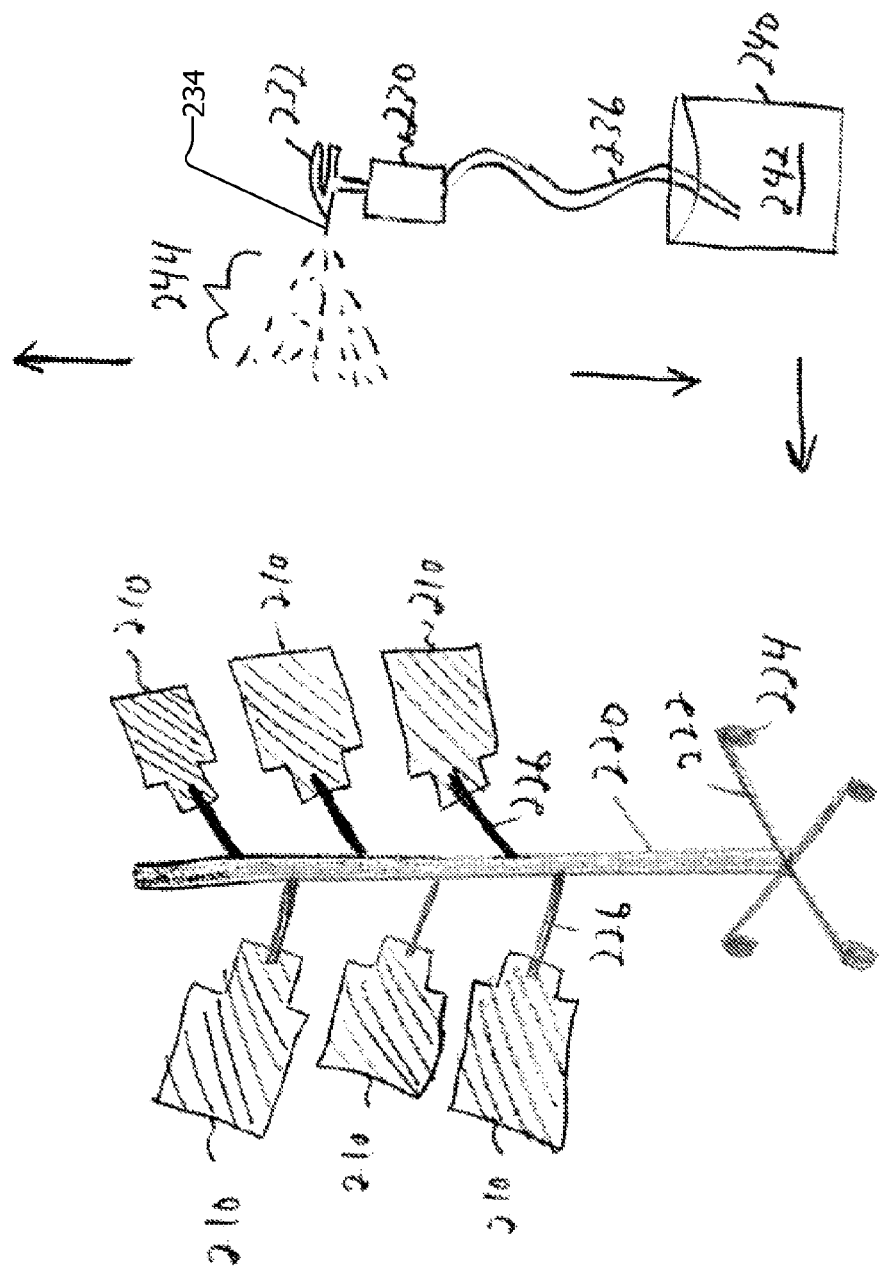
FIG. 2 is a drawing showing an example arrangement of a system for powder coating glass items.

A flow chart of a method of powder coating glass items is shown in FIG. 1. An example arrangement of a system for powder coating glass items is shown in FIG. 2. This disclosure will refer to both of these drawings throughout.

Generally, as described herein, to block light from passing through glass or into a glass article, two or three coats of powder are applied to a pre-heated glass article, and heat is used to cure the powder on the glass article. The powder initially adheres to the glass because of the temperature of the glass. Because of the choices of powder used for each of the powder coats, the coats of powder interact to block a desired amount of light having certain wavelengths. Because of the choices of powder used for each of the powder coats, the coats of powder interact to form a chemically resilient coating on the glass. The particles in the powder coats when applied to the glass article interact and/or crosslink to block light.

The powders used have common characteristics of typical powder coatings used in the industry, with key characteristics in ranges or amounts to achieve the methods described herein. The powders are polyester and/or epoxy, or a combination thereof. In one embodiment the first powder is epoxy and the second powder is polyester. In one embodiment, the first powder has a particle size in the range from 20-30 µm, and the second powder has a particle size in the range from 30-35 µm. In one embodiment, the first powder has a particle size of 25 µm, and the second powder has a particle size of 30 µm. In addition, the second powder is solvent resistant and meets the ASTM D5402 double rub standard. Further, the first powder has properties that allow it to stay wet longer, that is remain in a gel state longer and to flow for a longer period of time. Pertinent characteristics of the first powder are: a melting point in the range of 176-194° F., and in one embodiment a melting point of 188.6° F.; a gel time of 260-300 seconds, and in one embodiment a gel time of 262 seconds; a specific gravity of 1.2-1.4 $gr/cm^3$, and in one embodiment, a specific gravity of 1.3 $gr/cm^3$. Other pertinent characteristics of the second powder are: a melting point in the range of 176-194° F., and in one embodiment a melting point of 188.6° F.; a gel time of 97-107 seconds, and in one embodiment a gel time of 102 seconds; and a specific gravity in the range of 1.36-1.46 $gr/cm^3$ and in one embodiment a specific gravity of 1.41 $gr/cm^3$.

Referring to FIG. 1, as a preliminary step, first and second sprayers are loaded with powder or otherwise set up to spray glass articles, as shown in blocks 102 and 104. This is shown in FIG. 2, in which bucket or receptacle 240 is loaded with powder 242, and sprayer 230 having handle 232 and nozzle 234 is attached or coupled with the powder 242 in the bucket by a hose 236. In one embodiment, the sprayer may be hand operated. In another embodiment, the sprayer may operate in an automated way and/or be robotic. The sprayer moves or is moved vertically so as to evenly apply a spray of powder to the glass articles 210 on the rack 220. The sprayer 230 may be moved to or move a desired horizontal distance from the glass articles to apply an optimum amount of powder.

As another optional preliminary step, the glass articles may be prepared by dusting and/or washing with water, soap, and/or light acid, as shown in block 110.

As a further optional preliminary step, the glass articles 210 may be placed on a rack 220 having stems or branches 226 on which glass articles may be placed or attached. In one embodiment, the glass articles are bottles (large or small) in which stoppers or an internal blockage has been placed to both secure the bottle mouth and/or neck to the branches 226 and to keep powder from entering the inside of the bottles 210. The rack 220 may be mobile by having wheels 224 attached to a base 222 of the rack 220. The rack may be made out of a strong and resilient metal that can withstand the heat of the ovens described herein.

According to the method, a first oven is preheated to a desired air temperature such that that air in the oven reaches and is maintained at the desired air temperature, as shown in block 112. The oven may be a convection oven. In one embodiment, the preferred air temperature of the first oven is 425 degrees Fahrenheit. Other temperatures may be used that are within a range of 390 to 450 degrees Fahrenheit, so long as the appropriate glass temperature is reached in a desirable amount of time. This is discussed more below.

A second oven is preheated to a desired air temperature, such that that air in the oven reaches and is maintained at the desired air temperature, as shown in block 114. In one embodiment, the preferred air temperature of the second oven is 400 degrees Fahrenheit, while in another embodiment it is 450 degree Fahrenheit. Other temperatures may be used that are within a range of 390 to 450 degrees Fahrenheit, so long as the appropriate curing is achieved in a desired amount of time. This is discussed more below.

A third oven is preheated to a desired air temperature such that that air in the oven reaches and is maintained at the desired air temperature, as shown in block 116. In one embodiment, the preferred air temperature of the third oven is 400 degrees Fahrenheit. Other temperatures may be used that are within a range of 390 to 450 degrees Fahrenheit, so long as the appropriate curing is achieved in a desired amount of time. This is discussed more below.

In one embodiment, one oven is used, and the oven temperature is changed accordingly prior to entry of the glass articles or powder coated glass articles. That is, the first oven, the second oven and the third oven may all be the same oven.

Before any powder is applied to a glass article, the glass article is placed in an oven, and the glass article is heated at a first desired air temperature until the glass article reaches a first desired glass temperature and/or for a first set amount of time, as shown in block 120. In one embodiment, the first air temperature is approximately 425 degrees Fahrenheit and the first glass temperature is approximately 350 degrees Fahrenheit.

The glass article is removed from the oven, and, a first powder coating of the first powder is applied, as shown in block 130. The first powder coating is applied to the glass articles while the glass is hot but in an area of a building or in room that is at what is commonly known as room temperature, for example, 66-79° F.

The glass article is then placed in an oven where it is heated at a second air temperature for a second set time to reach a desired curing, as shown in block 140. In one embodiment the second air temperature is 400 degrees Fahrenheit and the second set time is 10 minutes. The glass article may move through the oven on a conveyor belt or automated system that moves at, for example, five feet per minute. The glass article is removed from the second oven after or when the second time has been reached or has expired.

The second powder coating of the second powder is then applied, as shown in block 150. When the second powder coating is applied, it interacts with and reacts with the first powder coating. The second powder coating blocks holes in the first powder coating that may let light through. The particles of the second powder fit in between and merge with the particles of the first powder coat. This may be considered crosslinking of the particles of the two different powders. It is in this way the light blocking properties of the multiple coatings of powders form a light blocking coating on the glass article.

The glass article having the first and second powder coats applied is then placed in an oven where it is heated at a third air temperature for a third set time to reach a desired curing, as shown in block 160. In one embodiment the third air temperature is 400 degrees Fahrenheit and the third set time is 30 minutes or 40 minutes. The glass article is removed from the third oven after or when the third time has been reached or has expired. The article is then let to cool to room temperature. Cool down time may be 10 minutes.

In one embodiment, the rack 220 is attached on its top to a vertical conveyor system that moves the rack and glass articles 210 through the oven at a set rate of speed. In this embodiment, the second air temperature is 450 degrees Fahrenheit and the glass articles move through the second oven at a rate of 5 feet per minute for 10 minutes. In another embodiment, the second air temperature is 400 degrees Fahrenheit and the glass articles move through the second oven at a rate of 5 feet per minute for 10 minutes.

In one embodiment, an optional third coating of a third powder is applied. The third powder may have similar characteristics to the first two powders. The third coating may be considered an aesthetic coating as it is not needed to achieve the light blocking qualities described herein. The aesthetic coating may have a desired color or other aesthetic features such as matte, gloss, sparkles and the like. The glass article is then placed in an oven where it is heated at a fourth air temperature for a fourth set time to reach a desired curing. In one embodiment, the fourth air temperature is 400 degrees Fahrenheit and the fourth set time is 30 minutes. The glass article is removed from the oven after or when the fourth time has been reached or has expired. The article is then let to cool at and to room temperature.

The resulting powder coated glass article blocks visible light and nonvisible light. The resulting powder coated glass article blocks light in the UVA, UVB and UVC spectrums. In one embodiment the resulting powder coated glass article blocks light in the range of 300 to 800 nanometer wavelength. In addition, the resulting powder coasted glass articles are impervious and/or resistant to harsh chemicals.

CLOSING COMMENTS

Throughout this description, the embodiments and examples shown should be considered as exemplars, rather than limitations on the apparatus and procedures disclosed or claimed. Although many of the examples presented herein involve specific combinations of method acts, it should be understood that those acts may be combined in other ways to accomplish the same objectives. With regard to flowcharts, additional and fewer steps may be taken, and the steps as shown may be combined or further refined to achieve the methods described herein.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A powder coating method to provide a light impenetrable coating on a glass article, the method comprising:
preheating an oven to a first air temperature;
placing the glass article in the oven;
heating the glass article in the oven at the first air temperature until the glass article reaches a first glass temperature and/or for a first set time;
removing the glass article from the oven;
applying a first powder coating to the glass article, wherein the first powder coating is of a first powder of an epoxy or polyester with a first particle size of 25 µm;
heating the oven to a second air temperature;
placing the glass article in the oven;
heating the glass article in the oven at the second air temperature for a second set time to reach a desired curing;
removing the glass article from the oven;
applying a second powder coating to the glass article, wherein the second powder coating is of a second powder of polyester with a second particle size of 30 µm and is solvent resistant;
heating the oven to a third air temperature;
heating the glass article in the oven at the third air temperature for a third set time to reach a final curing wherein the second powder coating interacts with the first powder coating such that particles of the second powder merge with particles of the first powder;
removing the glass article from the third oven;
letting the glass article cool at room temperature;
wherein a resulting powder coated glass article blocks all visible light.

2. The method of claim 1 wherein:
the first air temperature is approximately 425 degrees Fahrenheit;
the first glass temperature is approximately 350 degrees Fahrenheit.

3. The method of claim 1 wherein:
the first set time is 10 minutes.

4. The method of claim 3 wherein:
the second air temperature and the third air temperate are 400 degrees Fahrenheit;
the second set time is 10 minutes;
the third set time is 30 minutes.

5. The method of claim 3 wherein:
the second air temperature is 450 degrees Fahrenheit;
the third air temperature is 390 to 400 degrees Fahrenheit;
the second set time is 10 minutes
the third set time is 30 minutes.

6. The method of claim 1 wherein:
the second air temperature is 450 degrees Fahrenheit and the article moves through the oven at a rate of 5 feet per minute or the second air temperature is 400 degrees Fahrenheit and the article moves through the oven at the rate of 5 feet per minute;
the third air temperature is approximately 375 degrees Fahrenheit;
the third set time is 30 minutes.

7. The method of claim 1 wherein:
the first powder has a melting point of 176-194° F., a gel time of 260-300 seconds, and a specific gravity of 1.2-1.4 gr/cm$^3$;
the second powder has a melting point of 176-194° F., a gel time of 97-107 seconds, and a specific gravity in the range of 1.36-1.46 gr/cm$^3$.

8. The method of claim 1 wherein:
the first powder coating has a melting point of 188.6° F.; a gel time of 262 seconds, and a specific gravity of 1.3 gr/cm$^3$;
the second powder coating has a melting point of 188.6° F., and a gel time of 102 seconds, and a specific gravity of 1.41 gr/cm$^3$.

9. The method of claim 1 wherein the first powder and the second powder are the same material.

10. The method of claim 1 wherein a resulting powder coated glass article blocks light in the UVA, UVB and UVC spectrums.

11. The method of claim 1 wherein a resulting powder coated glass article blocks light at least in the range from 300 to 800 nanometer wavelength.

12. The method of claim 1 wherein a resulting powder coating on a resulting powder coated glass article resists caustic chemicals.

13. The method of claim 1 wherein a resulting powder coating on a resulting powder coated glass article conforms to ASTM D5402-06(2011) double rub standard.

* * * * *